US005784644A

United States Patent [19]
Larabell

[11] Patent Number: 5,784,644
[45] Date of Patent: Jul. 21, 1998

[54] CARRIER FOR CONNECTING DEVICE USING ELECTRICAL DISPLAY DEVICE FOR INDICATING SCSI ID AND CONTROLLER ID OF THE ATTACHED DEVICE ON THE CARRIERS FACIAL ASSEMBLY

[76] Inventor: Henri J. Larabell, 10241 Rancho Pl. #A, Cupertino, Calif. 95104

[21] Appl. No.: 384,553

[22] Filed: Feb. 2, 1995

[51] Int. Cl.⁶ .................................................. G06F 13/00
[52] U.S. Cl. ........................ 395/829; 395/828; 395/834; 395/836
[58] Field of Search ............................. 361/685, 796; 395/825, 283, 829, 828, 834, 836; 312/236

[56] References Cited

U.S. PATENT DOCUMENTS

| | | | |
|---|---|---|---|
| 3,813,649 | 5/1974 | Struger et al. | 340/172.5 |
| 4,060,848 | 11/1977 | Hyatt | 395/800 |
| 5,119,270 | 6/1992 | Bolton et al. | 361/384 |
| 5,227,957 | 7/1993 | Deters | 361/395 |
| 5,299,944 | 4/1994 | Larabell et al. | 439/157 |
| 5,339,221 | 8/1994 | Conroy-Wass et al. | 361/796 |
| 5,379,184 | 1/1995 | Barraza et al. | 361/685 |
| 5,398,158 | 3/1995 | Fisher et al. | 361/685 |
| 5,455,934 | 10/1995 | Holland et al. | 395/404 |
| 5,505,533 | 4/1996 | Kammersgard et al. | 312/236 |
| 5,507,650 | 4/1996 | Larabell | 439/61 |
| 5,515,515 | 5/1996 | Kennedy et al. | 395/283 |
| 5,518,412 | 5/1996 | Larabell | 439/157 |
| 5,524,268 | 6/1996 | Geldmna et al. | 395/825 |

FOREIGN PATENT DOCUMENTS

| 05143241 | 6/1993 | Japan | G06F 3/06 |
|---|---|---|---|

*Primary Examiner*—Frank J. Asta
*Assistant Examiner*—Le Hien Luu
*Attorney, Agent, or Firm*—Peninsula IP Group; Douglas A. Chaikin, Esq.

[57] ABSTRACT

Disclosed herein is a carrier for removeably interconnecting a memory storage device having a SCSI ID and a controller ID with an equipment frame. The carrier holds the memory storage device. The carrier removeably attaches to the equipment frame to facilitate hot swappability of the memory storage device. The carrier has a base, a facial assembly with a display and a circuit assembly. The base removeably locks into the equipment frame and supports a memory storage device and the facial assembly. The circuit assembly electrically connects the memory storage device and the display. Accordingly, the display can display information relating to the memory storage device including SCSI ID and controller ID.

23 Claims, 5 Drawing Sheets

CARRIER FOR CONNECTING DEVICE USING ELECTRICAL DISPLAY DEVICE FOR INDICATING SCSI ID AND CONTROLLER ID OF THE ATTACHED DEVICE ON THE CARRIERS FACIAL ASSEMBLY

RELATED U.S. PATENT APPLICATIONS AND U.S. PATENT

This present invention is related in subject matter to U.S. Pat. No. 5,299,944 issued Apr. 5, 1994; to commonly assigned U.S. Pat. No. 5,518,412 issued May 21, 1996; and to commonly assigned U.S. Pat. No. 5,507,650 issued Apr. 16, 1996. The disclosure of the related U.S. patent and U.S. patent applications is incorporated herein by reference.

BACKGROUND OF THE INVENTION

1. Field of the Invention

This invention relates to carriers which interconnect electrical devices with equipment frames. More particularly, this invention relates to carriers having display features.

2. Previous Art

Computers and digital technologies are rapidly advancing. As computers and computer systems become more advanced, the demand for the storage of digital information increases. This demand has resulted in the development of memory storage devices such as floppy disks, hard disk drives, magnetic tape drives and optical disk drives, for example. Many computers and computer systems now rely on multiple memory storage devices which interconnect with an equipment frame to optimize memory storage capability, safeguard memory storage integrity and facilitate expansion of memory storage capability.

The equipment frame connects electronically with a host system such as a computer system having a host computer. Electrical devices such as memory storage devices attach to carriers. The carriers removeably interconnect the electrical devices with the equipment frame. This removable interconnection is sometimes referred to as a "hot swappable" interconnection. A hot swappable interconnection between a carrier and an equipment frame facilitates hot swappability of the carrier.

Hot swappability of the carrier permits removal and installation of a variety of electrical devices with the equipment frame. The host system can operate uninterrupted during hot swapping of electrical devices. A hot swappable carrier which removeably connects electrical devices with an equipment frame is disclosed in U.S. Pat. No. 5,299,944 which is incorporated herein by reference. This carrier has a base, a locking structure and electrical connectors for interconnecting the electrical device with an equipment frame.

Typically, the host system interconnects with electrical devices via a conductor such as an electronic bus. Buses are generally made from ribbon cable. Common buses include 16 bit (wide) buses and 8 bit (narrow) buses, for example. A narrow bus can attach to up to 8 electrical devices with the host system. A wide bus can attach up to 16 electrical devices with the host system. In host systems having multiple electrical devices, device controllers are employed to regulate the operation of the multiple electrical devices. Common device controllers regulate the operation of electrical devices which attach to a single bus.

Typical host systems which rely on multiple buses, controllers and many electrical devices employ RAID (redundant array of inexpensive disks) technology or SCSI (standard computer storage interface) technology.

An equipment frame of a host system may have a number of racks. Each rack has module shells which are adapted to receive and hold a carrier. Systems having multiple racks can facilitate the attachment of hundreds of electrical devices. In host systems which rely on RAID technology, multiple racks can be arranged in RAID towers.

In various systems such as RAID and SCSI systems each bus has a number of conductors. Accordingly, each electrical device has a SCSI identification (ID) to identify which conductors communicate with any particular electrical device. In host systems having a single bus, the host system can identify each device by the SCSI ID.

In some cases, hot swappable carriers have a SCSI ID switch which attaches to the carrier and assigns a SCSI ID to an electrical device. A typical carrier having a SCSI ID switch is disclosed in U.S. Pat. No. 5,518,412 issued May 21, 1996 (Attorney Docket No. LARA 1451) the disclosure of which is incorporated by reference above. The electrical devices attached to such a carrier can include hard disk drives, optical disk drives, and tape drives for example. In other cases, the SCSI ID is electronically assigned to the carrier by the host system.

Effective connection of many electrical devices with many buses typically requires a controller (e.g. a SCSI controller or a RAID controller). Typically, each controller has a controller ID. The host system identifies each controller by the controller ID. The host system can thus electronically identify each electrical device using the controller ID in conjunction with the SCSI ID. However, the controller ID often fails to correspond to an actual physical location. The host system generally can not determine the actual physical location of an electrical device solely with the controller ID and the SCSI ID.

Electrical devices occasionally fail. Failed devices are typically removed to be repaired or replaced. Removal of such a failed device is difficult when the physical location of the device is not known.

To find the location of a failed electrical device, each device can be individually inspected. Such inspection can involve device removal and testing. In a tower housing multiple racks and hundreds of devices finding a single failed device can be time consuming and problematic. Removal of the wrong memory storage device, for example, can halt applications which run from the removed device. In some cases, this can cause systems to halt.

Effort has been directed to better facilitate the identification of electrical devices using a SCSI ID and a controller ID. In one known system labels are pasted on each device. The SCSI ID and the controller ID of the device is written on the attached label. When a device fails, for example, the host system identifies the failed device. The host system communicates the SCSI ID and controller ID of the failed device to a repair technician. The technician reads the pasted labels until the failed device is identified. Even in a room full of racks and hundreds of electrical devices, a failed device can be found.

Often electrical devices are removed from an equipment frame and later replaced in a different location, perhaps in a different equipment frame. When an electrical device in moved, the SCSI ID and the controller ID may change. A new SCSI ID and a new controller ID should be pasted onto the electrical device to identify the electrical device at the new location.

Pasted labels are time consuming to apply and to reapply. Pasted labels can and do fall off. Pasted labels can become sticky over time and are consequently hard to handle. Some labels are small, difficult to read and perhaps even illegible. Pasted labels are easily lost if not applied to an appropriate device. A more efficient and reliable way to effectively identify the location of electrical devices is desired.

To facilitate replacement of a failed electrical device, a technician must know whether the host system is configured for use with a single ended or differential electrical device. This can be determined by inspecting the failed device. Sometimes the failed device, is removed long before replacement occurs. The device type can be forgotten and an incompatibly configured device can be mistakenly connected to the host system.

Connection of an incompatibly configured device type (single ended or differential) to the host system can cause a myriad of problems.

Connection of an single ended device to an equipment frame which is configured for attachment to a differential device, for example, can cause the bus to which the electrical device attaches to shut down. Such a shut down inhibits operation of other electrical devices attached to the shut down bus. What is desired is a better way of determining whether the equipment frame is configured for use with a single ended or differential electrical device prior to insertion of an electrical device.

The technician must also know the bus type used i.e. if the device attaches to a wide or narrow bus. Wide buses are incompatible for connection with narrow devices and vice versa.

In some systems, a single controller can be housed in the rack to regulate a single bus and a limited number of electrical devices. In larger systems, numerous controllers may be employed to regulate numerous buses and numerous electrical devices. What is desired is a way to identify a controller associated with each bus to facilitate identification of electrical devices.

SUMMARY AND OBJECTS OF THE INVENTION

It is an object of the invention to provide a carrier which can quickly and easily identify failed electrical devices held in an equipment frame.

It is another object of this invention to provide a carrier which can hold an electrical device, and identify and display the device type and bus type along with other information relating to the electrical device.

It is another object of this invention to provide a way to identify electrical devices having a SCSI ID and a controller ID.

In accordance with the above objects and those that have been mentioned and those that will be mentioned and will become apparent below, a carrier for connecting an electrical device which is identifiable by a SCSI ID and a controller ID with an equipment frame, comprises:

a base connectable with equipment frame, the base being attachable to the electrical device;

a facial assembly attached to the base;

a display mounted on the facial assembly, the display being capable of indicating the SCSI ID and the controller ID; and a circuit assembly attached to the base, the circuit assembly being electrically connected with the display and electrically connectable to communicate with the electrical device and the equipment frame;

whereby, when the electrical device is attached to the base and to the circuit assembly, the circuit assembly communicates with the display, and the display indicates the SCSI ID and the controller ID for identifying the electrical device.

In a preferred embodiment the facial assembly includes a controller ID switch electronically connected with the display for regulating the controller ID indicated on the display.

In another preferred embodiment, the carrier has two sets of device type indicators for indicating when an equipment frame is electronically configured for use with single ended and differential electrical devices.

In another preferred embodiment, the circuit assembly includes a circuit board which removeably attaches to the circuit assembly. The carrier has a guiding structure with an alignment pin assembly and alignment pins. The circuit board snaps onto the alignment pin assembly and the alignment pin assembly snaps onto the base to removeably hold the circuit board on the base and to facilitate removal and replacement of the circuit board for adapting the carrier for use with a variety of electrical devices.

In another preferred embodiment, the carrier includes a fault indicator. The fault indicator is electronically attached to the circuit assembly for indicating when the electrical device fails to operate properly. The fault indicator is activated by the electrical device when the electrical device connects with the carrier and the electrical device fails to operate properly.

In another preferred embodiment, the carrier includes a busy indicator. The busy indicator is electronically attachable to the electrical device for indicating when the electrical device operates properly.

In another preferred embodiment, the carrier has a single ended device indicator and a differential device indicator. The circuit assembly has a jumper interface with jumper contacts for selectively configuring the circuit assembly for operation with single ended and differential electrical devices. The circuit assembly senses when the carrier attaches with an equipment frame which is electronically configured for use with a differential electrical device and activates the differential device indicator. The circuit assembly senses when the carrier attaches with an equipment frame which is electronically configured for use with a single ended electrical device and activates the single ended device indicator.

In another preferred embodiment, the facial assembly has a face plate. The face plate of the facial assembly has a plurality of parallel ridges to provide a gripping surface on the facial assembly.

In another preferred embodiment, the facial assembly includes a plastic face plate. The face plate has slots and a metal support structure having a plurality of holes to facilitate air flow and convective heat transfer through the facial assembly.

In another preferred embodiment, the circuit assembly includes jumper contacts. The jumper contacts configure the circuit assembly for testing the equipment frame to determine whether the equipment frame is configured for use with single ended and differential electrical devices.

In another preferred embodiment, the facial assembly includes a support member, an indicator plate, and a face plate. The face plate and the indicator plate attach to the support member. The support member has a front, two sides and two bottom flaps. The bottom flaps are attachable to the base.

In another preferred embodiment, the facial assembly has a face plate which is rectangular in shape. The face plate has a length within the range of 5–7 inches and a width of between 1.5–2.5 inches to cover the memory storage device.

In another preferred embodiment, the face plate has a length of about 6 inches and a width of about 1.75 inches.

It is an advantage of the present invention to provide a carrier which can quickly and easily identify electrical devices held in an equipment frame with a display.

It is another advantage of the present invention to provide a carrier which can hold an electrical device and which can identify the electrical device by a SCSI ID and a controller ID with a display.

It is another advantage of the present invention to provide a carrier which can hold an electrical device and identify an associated controller with a display.

BRIEF DESCRIPTION OF THE DRAWINGS

For a further understanding of the objects and advantages of the present invention, reference should be given to the following detailed description, taken in conjunction with the accompanying drawings, in which like parts are given like reference numerals and wherein.

DETAILED DESCRIPTION

Figure 1:
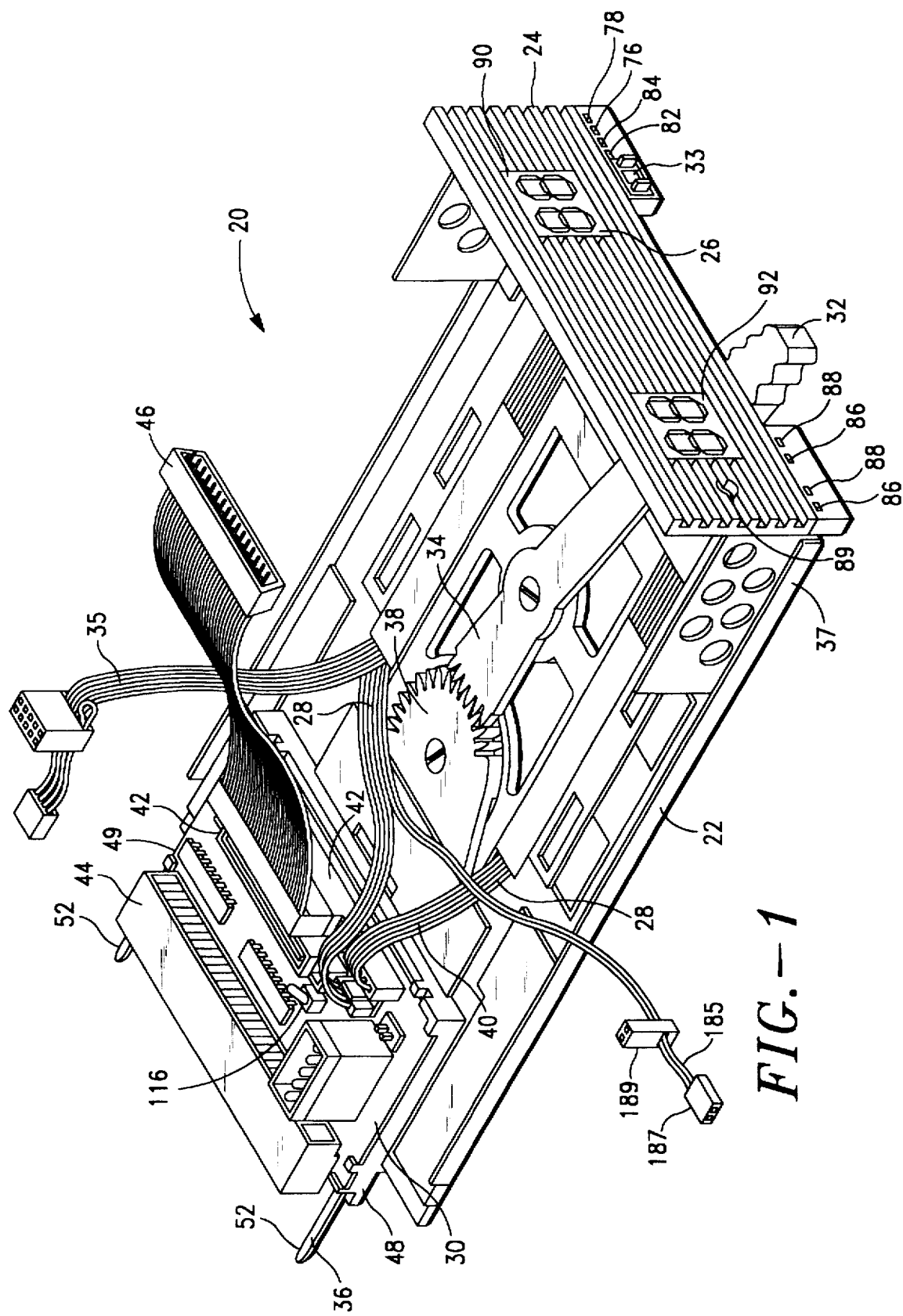
FIG. 1 is a perspective view of a carrier having display features in accordance with the present invention.

With particular reference to FIG. 1, there is shown a carrier generally designated by the reference numeral 20. The carrier 20 has a base 22, a facial assembly 24, a display 26, wiring 28 and a circuit assembly 30. The facial assembly 24 and the circuit assembly 30 attach to the base 22. The display 26 mounts on the facial assembly 24. The wiring 28 electronically attaches the facial assembly 24 to the circuit assembly 30. The carrier 20 is adapted for installation into a host system via an equipment frame. The host system includes an electrical device controller which electronically communicates with the carrier 20 via the equipment frame.

The carrier 20 has a locking mechanism 34 and a guiding structure 36 to facilitate hot swappability of the carrier 20. The locking mechanism 34 includes a lever 32 and a geared portion 38. The lever 32 rotates the geared portion 38 to lock the carrier 20 into an equipment frame. An example of a locking mechanism 34 is disclosed in commonly assigned U.S. patent application Ser. No. 08/272/702 filed Jul. 11, 1994, (Attorney Docket No. LARA1451), the disclosure of which is incorporated by reference above.

The guiding structure 36 includes an alignment pin assembly 48 and alignment pins 52 to facilitate hot swappability of the carrier 20 with an equipment frame of a host system. The alignment pin assembly 48 is rectangular shaped. The alignment pin assembly 48 removeably attaches to the base 22 and to the circuit assembly 30. The alignment pin assembly removeably holds the circuit assembly 30 to facilitate removal of the circuit assembly 30 from the base 22. The alignment pins 52 extend from the alignment pin assembly 48 to align the guiding structure 36 with an equipment frame when the carrier 20 installs into the equipment frame. A guide rail 37 is defined on the base 22 to further facilitate alignment of the circuit assembly 30 with an equipment frame.

The display includes a SCSI ID indicator 90 and a controller ID indicator 92. Each indicator 90-92 includes LED numerals which illuminate to indicate SCSI ID and controller ID respectively. The SCSI ID for an electrical device attached to a single wide bus typically can be a numeral from 0–15. The SCSI ID for an electrical device attached to a pair of wide buses can be a numeral from 0–31. The controller ID is a number having a value of one or greater. The controller ID numeral is limited by the number of controllers employed by any particular system. The SCSI ID indicator 90 indicates which bit carrying conductor within a particular bus communicates with the carrier 20. The controller ID indicator 92 indicates which device controller communicates with the carrier 20.

A SCSI ID switch 33 attaches to the facial assembly 24 for assigning a SCSI ID numeral to the carrier 20. The SCSI ID switch 33 communicates with the SCSI ID indicator 90 to cause the SCSI ID indicator 90 to display the SCSI ID numeral set by the SCSI ID switch. An example of a SCSI ID switch 33 is disclosed in U.S. Pat. No. 5,299,944, the disclosure of which is incorporated by reference above. Such SCSI ID switches includes a numerical display which is small and visible only at close distances (e.g. 2–3 feet).

A controller ID switch 89 attaches to the facial assembly 24 and communicates with the controller ID indicator 92. The controller ID switch 89 regulates operation of the controller ID indicator 92. The controller ID switch 89 communicates with the controller ID indicator 92 to display the controller ID numeral. It can be appreciated, however, that the controller ID switch 89 can alternatively attach to the circuit assembly 30 to regulate the controller ID indicator 92. Additionally, the host system can be adapted to communicate the controller ID to the circuit assembly 30 and the circuit assembly 30 can regulate the controller ID indicator 92.

The circuit assembly 30 has two ribbon cable connectors 42, a ribbon cable 46, a toggle switch 116, and an equipment frame connector 44. The equipment frame connector 44 is capable of connection to the equipment frame via two buses. Accordingly, the circuit assembly 30 interconnects each ribbon cable connector 42 with respective buses from the equipment frame.

The ribbon cable 46 is removeably connectable with a single selected ribbon cable connector 42 for interconnecting the circuit assembly 30 with an electrical device. The toggle switch 116 mounts on the circuit assembly 30 for indicating to which ribbon cable connector 42 the ribbon cable 46 attaches. In one embodiment each ribbon cable connector 42 is a wide SCSI ribbon cable connector for connecting the carrier 20 to a wide electrical device. In another embodiment, each ribbon cable connector 42 is a narrow SCSI ribbon cable connector for connecting the carrier 20 to a narrow electrical device.

The circuit assembly 30 has a circuit board 49 which snaps onto the alignment pin assembly 48. The alignment pin assembly 48 snaps onto the base 22. The alignment pin assembly 48 eases removal and replacement of the circuit board 49. Removal and replacement of the circuit board 49 is desirable such as when the circuit board 49 fails, or is upgraded. Replacement of the circuit board 49 facilitates use of the carrier 20 with any of a multitude of electrical devices 50.

The carrier 20 has several indicators 76–88 mounted on the base 22 of the carrier 20. Each indicator 76–88 includes a light emitting diode (LED) for easy visibility. The indicators 76–88 include bus indicators 76–78, two sets of device type indicators 86-88, a fault indicator 82 and a busy indicator 84. The bus indicators 76-78 include a wide bus indicator 76 and a narrow bus indicator 78.

Each bus indicator 76-78 is hard wired to the circuit assembly to communicate with the circuit assembly. The wide bus indicator 76 illuminates continuously to indicate that the ribbon cable connectors 42 are configured for connection to a wide bus. The narrow bus indicator 78 illuminates continuously to indicate that the ribbon cable connectors 42 are configured for connection to a narrow bus.

Each set of device type indicators 86-88 includes single ended device indicator 86, and a differential device indicator 88. Each set to device type indicators is associated with a ribbon cable connector 42. The toggle switch 116 is manually actuated to selectively activate one set of device type indicators 86-88 to indicate which associated ribbon cable connector 42 connects with the electrical device 50.

The busy indicator 84 has a busy indicator cable 185. The busy indicator cable 185 is electronically connectable with an electrical device to establish electronic communication between the busy indicator 84 and an electrical device. The busy indicator 84 illuminates to indicate when an attached electrical device operates properly. The busy indicator cable 84 has two pin connectors 187 and 189 having varied sizes for selective attachment to various size jumper pins of an electrical device. For example, connector 187 can be adapted for attachment to pins having a pin spacing of 0.1 inches and connector 189 can be adapted for attachment to pins having a pin spacing of 2 milimeters.

The fault indicator 82 electronically connects with the circuit assembly 30 via wiring 28 to indicate when an electrical device which is attached to the base 22 fails to properly function. It can be appreciated that the fault indicator 82 can also attach directly to an electrical device in accordance with the present invention.

Figure 2:
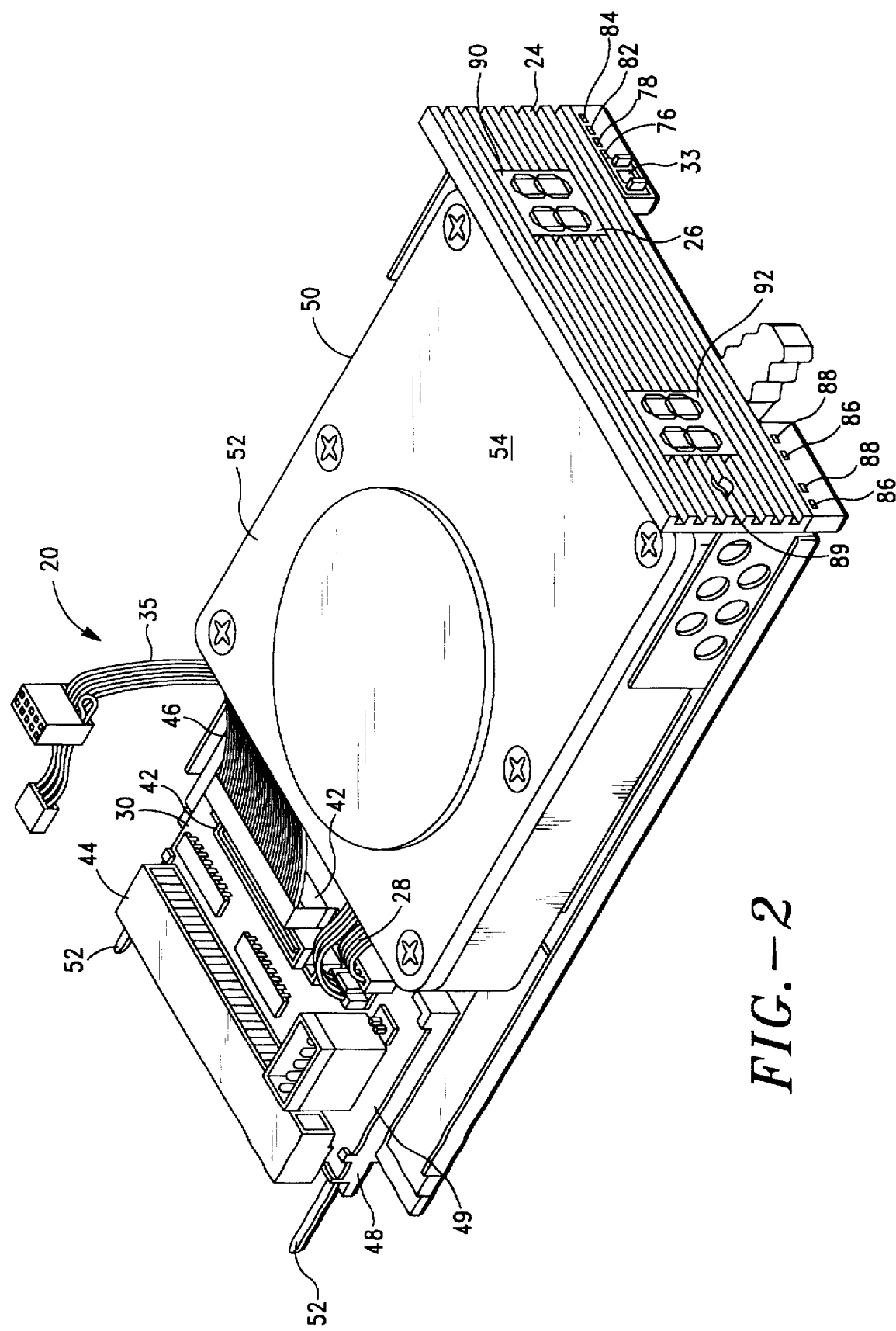
FIG. 2 is a perspective view of the carrier of FIG. 1 attached to an electrical device.

With particular reference to FIG. 2, there is shown an electrical device 50 attached to the base 22 of the carrier 20. The ribbon cable 46 electronically connects the electrical device 50 with one ribbon cable connector 42 of the circuit assembly 30. The electrical device 50 includes a memory storage device 52. A low profile hard disk drive 54 is shown attached to the carrier 20. It can be appreciated that the base 22 is appropriately configured in size to accommodate various memory storage devices (e.g. tape drives and optical disk drives) and various other electrical device types (e.g. device controllers) which can attach to the base 22 in accordance with the present invention.

The equipment frame 64 (FIG. 3) is configured for use with either single ended or differential devices. The circuit assembly 30 senses the configuration of the equipment frame to determine whether the equipment frame is compatible for use with single ended or a differential electrical devices.

Each set of device type indicators 86-88 communicates with the circuit assembly 30 via the wiring 28. The circuit assembly 30 illuminates one of the device type indicators 86-88 type indicators to indicate which ribbon cable connector 42 is active and to indicate whether the equipment frame 64 (FIG. 3) is configured for use with single ended or differential electrical devices. The circuit assembly 30 illuminates a single ended device indicator 86 to indicate that the equipment frame 64 (FIG. 3) is configured for use with a single ended electrical device. The circuit assembly 30 illuminates a differential device indicator 88 indicate that the equipment frame 64 (FIG. 3) is configured for use with a differential electrical device.

The fault indicator 82 attaches to the circuit assembly 30 via the wiring 28 to communicate with an electrical device 50. The fault indicator 82 activates in response to failure or malfunction of the electrical device 50. Malfunctions of the electrical device 50 can include head crashes, read and write errors, controller failures and data corruption. Such malfunctions, and others, can cause the fault indicator 82 to activate. Accordingly, the circuit assembly 30 activates the fault indicator 82 when the electrical device 50 connects with the carrier 20 and fails to operate properly. The fault indicator 82 includes a LED which illuminates during activation of the fault indicator 82. It can be appreciated that the fault indicator 82 can be electronically attached directly to the electrical device 50 in accordance with the present invention.

The busy indicator 84 electronically communicates with the electrical device 50 and illuminates to indicate when the electrical device 50 operates properly. When the electrical device 50 includes a memory storage device 54, for example, proper operation includes reading and writing data to and from the memory storage device 54.

The circuit assembly 30 is electronically configurable for use with single ended and differential electrical devices. The single ended device indicator 86 and the differential device indicator 88 attach to the circuit assembly 30 to indicate whether the circuit assembly 30 is configured for attachment to a single ended or differential electrical device respectively. The circuit assembly 30 selectively activates the differential device indicator 88 and the single ended device indicator 86.

A SCSI ID cable 35 attaches to the SCSI ID switch 33. The SCSI ID cable 35 extends from the SCSI ID switch 33 and is attachable with the electrical device 50. The SCSI ID cable 35 communicates a SCSI ID numeral assigned by the SCSI ID switch 33 to the electrical device 50.

Figure 3:
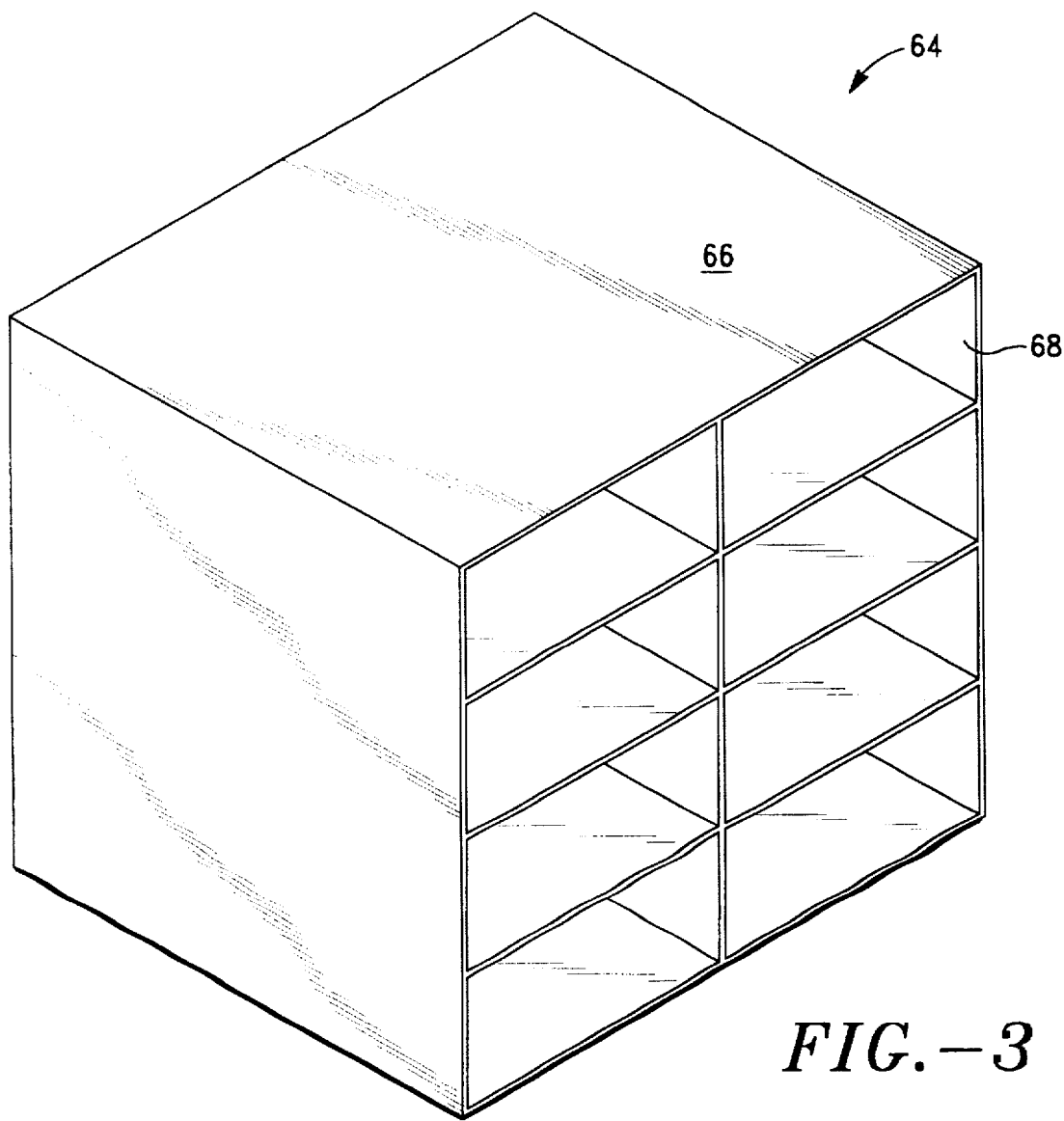
FIG. 3 is a perspective view of an equipment frame.

With particular reference to FIG. 3 there is shown an equipment frame generally designated with the reference numeral 64. The equipment frame 64 is connectable to communicate with a host system such as a computer system. In this way, the equipment becomes a part of the host system. The equipment frame 64 includes a rack 66 with multiple module shells 68 (e.g. 8). Although eight module shells 68 are shown, racks 66 can include virtually any number of module shells 68. Each module shell 68 communicates with the host system.

Figure 4:
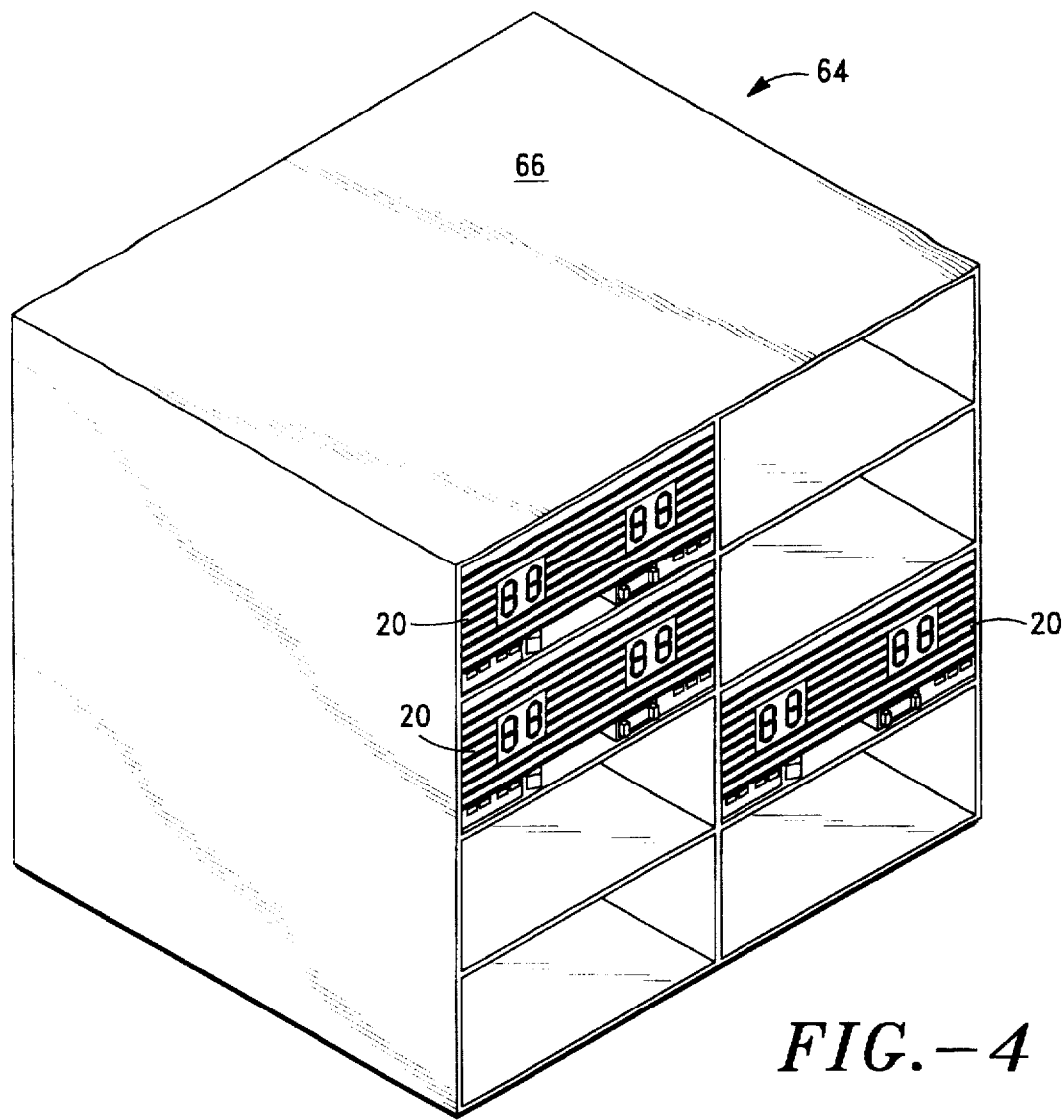
FIG. 4 is a perspective view of a the equipment frame of FIG. 3 having several carriers attached.

With particular reference to FIG. 4, there is shown the equipment frame 64. The equipment frame removably holds several carriers 20 to facilitate hot swappability of the carriers 20. Each module shell 68 is capable of holding a carrier 20 to facilitate hot swappability. Three carriers 20 are shown attached to the equipment frame 64. Each carrier 20 is hot swappable.

Each carrier 20 holds an electrical device 50 (FIG. 2). It can be appreciated that a controller such as a SCSI controller or a raid controller included with the host system electronically connect with the rack 66 to regulate the operation of each carrier 20 and each associated electrical device 50 (FIG. 2).

Figure 5:
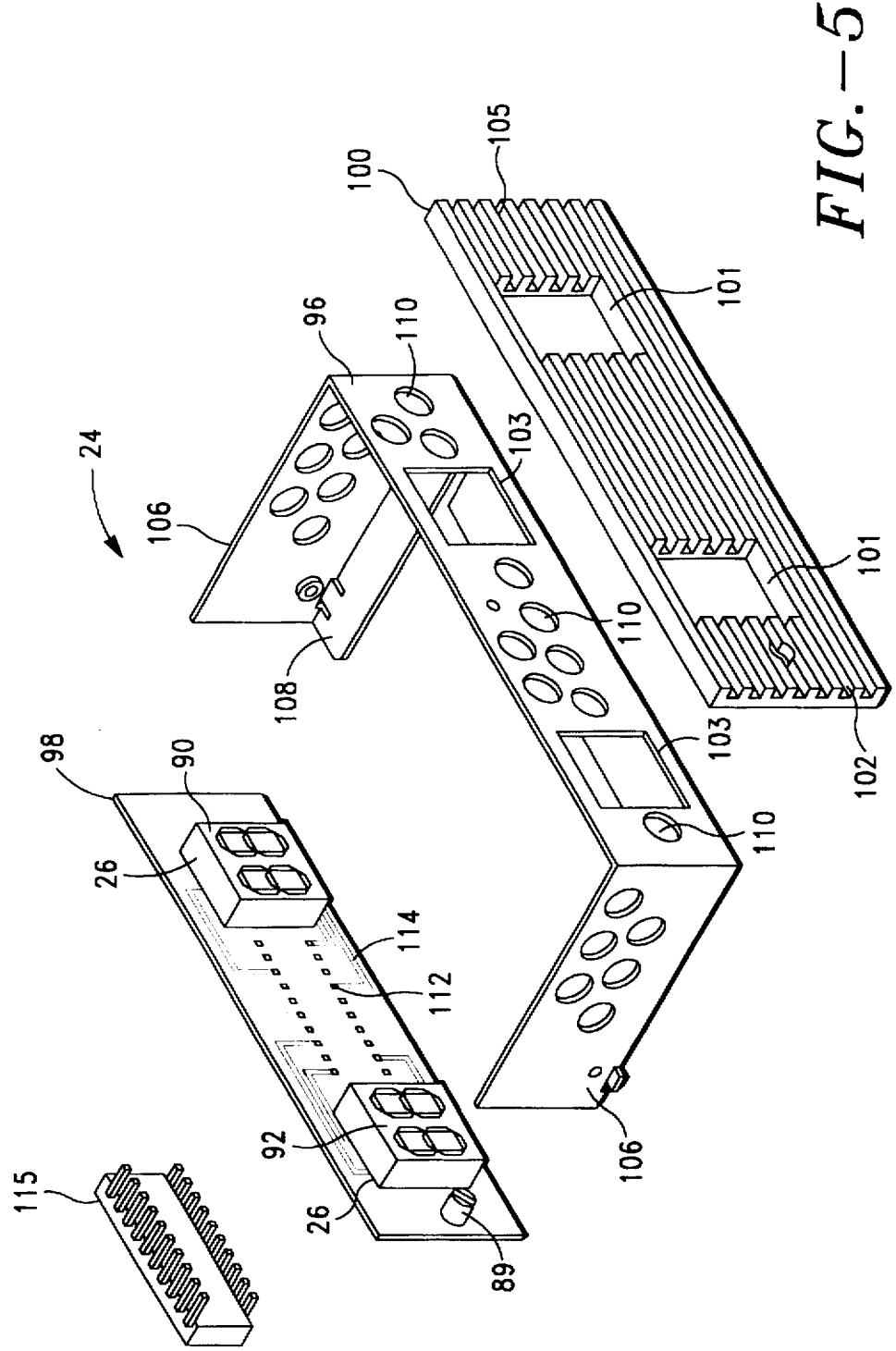
FIG. 5 is an exploded view of the facial assembly of FIG. 1.

With particular reference to FIG. 5 there is shown the facial assembly generally designated with the reference numeral 24. The facial assembly 24 includes a support member 96, an indicator plate 98, and a face plate 100. The face plate 100 snaps onto the support member 96. The indicator plate 98 attaches to the support member 96 and opposes the face plate 100.

The face plate 100 has a plurality of parallel ridges 102 which permit the face plate 100 to flex and absorb shock such as experienced when the carrier 20 inserts into a module shell 68 (FIG. 4) of an equipment frame. The ridges 102 provide a gripping surface for holding the facial assembly 24.

The ridges 102 define slots 105 between the ridges 102 which permit airflow through the face plate 100. The face plate 100 is made from plastic. The face plate 100 is rectangular in shape having a length within the range of 5–7 inches and a width of between 1.5 and 2.5 inches to cover standard sized electrical devices. Preferably, the face plate has a length of about 6 inches and a width of about 1.75 inches. The face plate 100 has holes 101 for receiving each display 26.

The support member 96 is a flat strip having a front 104 with holes 103, two sides 106 and a bottom flap 108 on each side 106. The sides 106 extend perpendicularly from the front 104. The bottom flap 108 extends perpendicularly from each side 106 for attaching to the base 22 of the carrier 20 (FIG. 1). The support member 96 is made from a durable metal such as stainless steel and is formed with a plurality of holes 110 to reduce the weight of the support member. One hole 110 receives permits the switch 105 when the switch 105 mounts on the facial assembly 24. The holes 110 facilitate air flow through the support member 96 and through the face plate 100.

The indicator plate 98 includes electrical contacts 112, electrical conductors 114, a microprocessor 115, the SCSI ID indicator 90, the controller ID indicator 92 and the controller ID switch 89. The microprocessor 115 attaches to the electrical contacts 112 for regulating the operation of the SCSI ID indicator 90 and the controller ID indicator 92. The electrical conductors 114 establish communication between the electrical contacts 112, the SCSI ID indicator 90, the controller ID indicator 92, and the microprocessor 115 respectively. The indicators 90–92 protrude from the indicator plate 98 to extend through the support member 96 and the face plate 100.

The controller ID switch 89 is a rotatable switch which extends from the indicator plate 98 through a hole 110 in the support member 96 and through the face plate 100. The controller ID switch 89 rotates to selectively activate the controller ID indicator 92 to cause a selected controller ID to be displayed. The controller ID switch 89 communicates electronically with the circuit assembly and the controller ID indicator 92 via the indicator plate 98.

Figure 6:
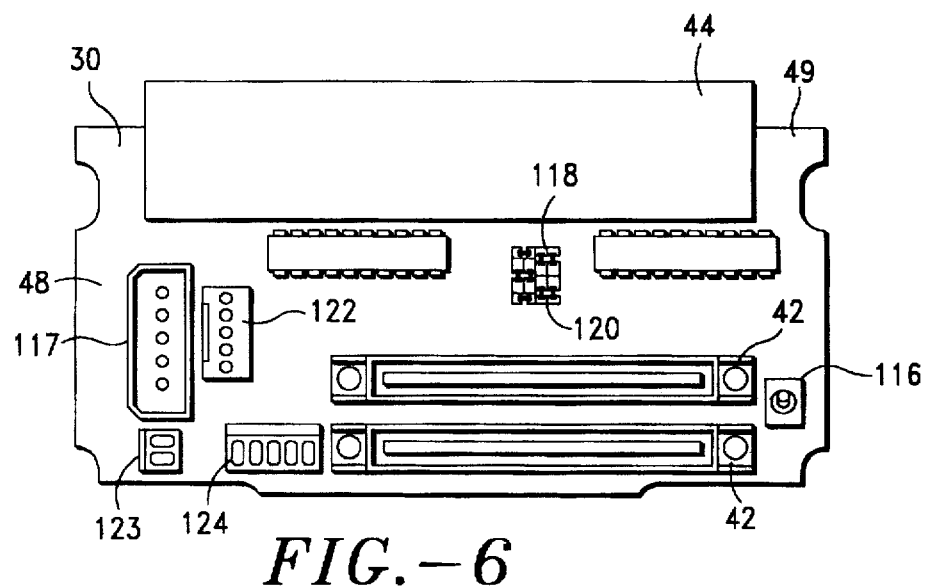
FIG. 6 is a top view of a circuit assembly in accordance with the present invention.

With particular reference to FIG. 6 there is shown the top view of an embodiment of the circuit assembly 30. The circuit assembly 30 includes the circuit board 49. The circuit board 49 has a toggle switch 116, a power supply port 117, a jumper interface 118 with jumper contacts 120, the pair of ribbon cable connectors 42, and the equipment frame connector 44. The circuit board 49 has multiple pin connectors 122, 123 and 124 for connection to the various indicators 72–88 (FIG. 1).

The jumper interface 118 is configured to receive jumpers over the jumper contacts 120. For example, the jumper interface 118 can include jumper contacts 120 for configuring the circuit assembly 30 and the carrier 20 for use with various electrical devices including single ended and differential electrical devices.

The jumper interface 118 is capable of testing the function of the circuit assembly 30. One pair of jumper contacts 120 and the circuit assembly 30 are configured to bypass the toggle switch 116 to activate both sets of device type indicators 86–88 (FIG. 1). With both sets of device type indicators activated, the carrier is insertable into the equipment frame (FIG. 4) without an electrical device. When the equipment frame is configured for use with single ended devices a single ended device indicator 86 illuminates, when the equipment frame is configured for use with differential devices, the a differential device indicator 88 illuminates. In this way, a technician can determine whether the carrier 20 host system and the equipment frame are configured to connects with the carrier 20 and an electrical device which are single ended or differential.

While the foregoing detailed description has described a preferred embodiment of the present invention, it is to be understood that the above description is illustrative only and not limiting of the disclosed invention. It will be appreciated that modifications of the present invention are possible. For example, the present invention can be adapted with multiple indicators and displays 24 of various types such as those which connect directly to an electrical device or to a host system via the equipment frame and the circuit assembly. Additionally, the carrier 10 can be modified to accommodate a variety of electrical devices including RAID controllers and various types of memory storage devices 52.

It can be appreciated that the circuit assembly 30 is adaptable for a variety of memory storage devices 52 and can be replaced with any of a number of circuit assemblies to facilitate attachment of any of a number of electrical devices to the carrier 20. Particular circuit assemblies can include wiring to enable the carrier 20 to sense and select controller and SCSI ID numerals for display on the controller ID indicator 92 and the SCSI ID indicator 90 respectively. The scope of the present invention is to be limited only by the claims as set forth below.

We claim:

1. A carrier for connecting an electrical device which is identifiable by a SCSI ID and a controller ID with an equipment frame, comprising:

a base connectable with the equipment frame, the base being attachable to the electrical device;

a facial assembly attached to the base;

an electrical display device mounted on the facial assembly, the display being capable of indicating the SCSI ID and the controller ID;

a circuit assembly attached to the base, the circuit assembly being electrically connected with the display and electrically connectable to communicate with the electrical device and the equipment frame;

whereby, when the electrical device is attached to the base and to the circuit assembly, the circuit assembly communicates with the display, and the display indicates the SCSI ID and the controller ID for identifying the electrical device.

2. A device as set forth in claim 1, wherein the display indicates the controller ID, facial assembly includes a controller ID switch which communicates with the display for regulating the controller ID indicated on the display.

3. A device as set forth in claim 1, wherein the carrier has two sets of device type indicators for indicating when the equipment frame is electronically configured for use with single ended and differential electrical devices.

4. A device as set forth in claim 1, wherein the circuit assembly includes a circuit board which removeably attaches to the circuit assembly, the carrier has a guiding structure with an alignment pin assembly and alignment pins, the circuit board snaps onto the alignment pin assembly and the alignment pin assembly snaps onto the base to removeably hold the circuit board on the base and to facilitate removal and replacement of the circuit board for adapting the carrier for use with a variety of electrical devices.

5. A device as set forth in claim 1, wherein the carrier includes a fault indicator electronically attached to the circuit assembly for indicating when the electrical device fails to operate properly, the fault indicator is activated by the electrical device when the electrical device connects with the carrier and the electrical device fails to operate properly.

6. A device as set forth in claim 1, wherein the carrier includes a busy indicator electronically attachable to the electrical device for indicating when the electrical device operates properly.

7. A device as set forth in claim 1, wherein the carrier has a single ended device indicator and a differential device indicator, the circuit assembly has a jumper interface with jumper contacts for selectively configuring the circuit assembly for operation with single ended and differential electrical devices, the circuit assembly senses when the carrier attaches with an equipment frame which is electronically configured for use with a differential electrical device and activates the differential device indicator, the circuit assembly senses when the carrier attaches with an equipment frame which is electronically configured for use with a single ended electrical device and activates the single ended device indicator.

8. A device as set forth in claim 1, wherein the facial assembly has a face plate, the face plate of the facial assembly has a plurality of parallel ridges to provide a gripping surface on the facial assembly.

9. A device as set forth in claim 1, wherein the facial assembly includes a plastic face plate having slots and a metal support structure having a plurality of holes to facilitate air flow and convective heat transfer through the facial assembly.

10. A device as set forth in claim 1, wherein the circuit assembly includes jumper contacts which configure the circuit assembly for testing the equipment frame to determine whether the equipment frame is configured for use with single ended and differential electrical devices.

11. A device as set forth in claim 1, wherein the facial assembly includes a support member, an indicator plate, and a face plate, the face plate and the indicator plate attach to the support member, the support member having a front, two sides and two bottom flaps, the bottom flaps being attachable to the base.

12. A device as set forth in claim 1, wherein the facial assembly has a face plate which is rectangular in shape having a length within the range of 5–7 inches and a width of between 1.5–2.5 inches to cover the memory storage device.

13. A device as set forth in claim 12, wherein the face plate has a length of about 6 inches and a width of about 1.75 inches.

14. A carrier for connecting an electrical device which is identifiable by a SCSI ID and a controller ID with an equipment frame, comprising:

a base connectable with the equipment frame, the base being attachable to the electrical device;

a facial assembly attached to the base;

an electric display device mounted on the facial assembly, the display being capable of indicating the SCSI ID and the controller ID;

a circuit assembly attached to the base, the circuit assembly being electrically connected with the display and electrically connectable to communicate with the electrical device and the equipment frame, the circuit assembly being selectively adaptable for use with single ended and differential electrical devices; and an indicator means electronically attached to the circuit assembly for selectively indicating when the circuit assembly is adapted for use with single ended and differential devices, whereby, when the electrical device attaches to the base and to the circuit assembly, the circuit assembly communicates with the display, and the display indicates the SCSI ID and the controller ID for identifying the electrical device.

15. A device as set forth in claim 14, wherein the indicator means includes an light emitting diode.

16. A device as set forth in claim 14, wherein the circuit assembly has a wide SCSI ribbon cable connector for connecting the carrier to a wide electrical device.

17. A device as set forth in claim 14, wherein the circuit assembly has a narrow SCSI ribbon cable connector for connecting the carrier to a narrow electrical device.

18. A carrier used in conjunction with a RAID system having a RAID controller for connecting a memory storage device with an equipment frame, comprising:

a memory storage device, the memory storage device having a SCSI ID and a controller ID;

a base connectable with the memory storage device;

a facial assembly attached to the base;

a display mounted on the facial assembly, the display indicates the SCSI ID and the controller ID of the memory storage device;

a circuit assembly attached to the base, the circuit assembly being electrically connected to communicate with the display, the circuit assembly being capable of electrically connecting the memory storage device with the equipment frame;

whereby, when the memory storage device connects with the base and with the circuit assembly and the circuit assembly communicates with the display, the display indicates the SCSI ID and the controller ID of the memory storage device.

19. A device as set forth in claim 18, wherein the display include LEDs which display numerals for indicating SCSI ID and controller ID respectively.

20. A device as set forth in claim 18, wherein the memory storage device is a hard disk drive.

21. A device as set forth in claim 18, wherein the memory storage device is an optical disk drive.

22. A device as set forth in claim 18, wherein the carrier has a guiding structure having an alignment pin assembly with alignment pins, the alignment pin removeably assembly holds the circuit assembly and facilitates removal and replacement of the circuit assembly from the base.

23. A device as set forth in claim 18, wherein the circuit assembly has a jumper interface with jumper contacts for configuring the circuit assembly to determine whether the host system and the equipment frame connects with the carrier with single ended or differential buses.

* * * * *